United States Patent [19]
Kon

[11] Patent Number: 4,771,150
[45] Date of Patent: Sep. 13, 1988

[54] METHOD OF FORMING TRIM COVER ASSEMBLY FOR AUTOMOTIVE SEAT

[75] Inventor: Shigeki Kon, Akishima, Japan

[73] Assignee: Tachi-S Co., Ltd., Tokyo, Japan

[21] Appl. No.: 67,926

[22] Filed: Jun. 29, 1987

[51] Int. Cl.⁴ .............................................. H05B 6/54
[52] U.S. Cl. ................... 219/10.41; 219/10.53; 219/10.81; 156/274.6; 156/380.6; 156/228
[58] Field of Search ............... 219/10.41, 10.53, 10.43, 219/10.81, 10.67; 156/379.6, 379.8, 380.2, 380.3, 380.4, 380.5, 380.6, 300.8, 213, 228, 381, 256, 258, 272.2, 273.7, 274.4, 274.6

[56] References Cited
U.S. PATENT DOCUMENTS

| 2,407,833 | 9/1946 | Jablonsky | 156/380.6 |
| 2,936,816 | 5/1960 | Lang | 156/273.7 |
| 3,401,248 | 9/1968 | Kim | 156/274.4 X |
| 4,295,908 | 10/1981 | Schaefer et al. | 219/10.53 X |
| 4,337,106 | 6/1982 | Wheeler | 156/228 |
| 4,352,709 | 10/1982 | Urai et al. | 219/10.53 X |
| 4,427,865 | 1/1984 | Watanabe | 219/10.41 |
| 4,539,793 | 9/1985 | Malek | 219/10.53 X |

Primary Examiner—Philip H. Leung
Attorney, Agent, or Firm—Oldham & Oldham

[57] ABSTRACT

A method of forming a trim cover assembly for an automotive seat by means of a high-frequency welding in which a previously-cut film of a predetermined shape adapted to represent a decorative pattern is welded to a substrate, to thereby form the trim cover assembly. In this method, a welding die is employed which has an outer configuration identical to that of the film and a film guide provided therewith.

6 Claims, 2 Drawing Sheets

METHOD OF FORMING TRIM COVER ASSEMBLY FOR AUTOMOTIVE SEAT

BACKGROUND OF THE INVENTION

1. Field of the Invention

The present invention relates to a method of forming a trim cover assembly for an automotive seat, and more particularly relates to a method of welding a film of decorative pattern to a trim cover assembly by means of a high frequency.

2. Description of the Prior Art

To provide a decorative pattern on a trim cover assembly, there has been enforced a decorative film lamination method using a high-frequency welding.

FIG. 1 of the accompanying drawings illustrates a typical conventional method of this type. According to such method, a lower electrode (11) and a welding die made of silicone (12) are employed, and in particular, a cutting blade (16) is provided at the peripheral ends of the welding die (12). The process consists of the following steps:

(a) Placing an insulation paper (13) on the lower electrode (11), (b) Laminating a film (15) on the insulation paper (13), the film (15) being adapted for pattern formation, and then a substrate (14) of synthetic resin leather or synthetic resin woven fabric, on the film (15), the substrate (14) referring to a trim cover assembly, (c) Lowering the welding die (12) having an uneven welding surface (12a) and pressing it against the film (15), with the cutting blade (16) trimming the film (15) along the peripheral contour of the welding die (12).

It is therefore observed that the film (15) is cut into a certain decorative shape and given a certain uneven pattern in a simultaneous fashion, thus providing a decorative pattern on the substrate (14).

However, the above-mentioned method is found defective and disadvantageous in the undermentioned aspects (1) In the case that a leather or a thin film is used for the substrate (14), it is highly possible that the cutting blade (16) will penetrate into such kind of substrate and cut the same unexpectedly, so that any kind of material can not be used for the substrate (14).

(2) In order to retain a sufficient cutting precision to cut the film (15) precisely, the welding die (12) per se, which has the cutting blade (16) thereon, must necessarily be formed and installed with a high precision, not to mention the blade (16).

(3) The cutting blade (16) requires a fine adjustment of its projecting status relative to the the welding die (12) according to a varied thickness of the film (15), thus involving a troublesome step.

SUMMARY OF THE INVENTION

In view of the above-discussed drawbacks of the conventional method, the present invention is directed to avoiding those drawbacks in the film lamination welding method.

It is therefore a purpose of the present invention to provide an improved method of forming a trim cover assembly for an automotive seat in which a film for pattern formation can easily be cut without any possibility of a cutting blade penetrating into a substrate layer beneath the film, thereby avoiding the cutting of the substrate layer, and whose steps are well designed to provide a great forming efficiency.

In order to achieve the above purpose, in accordance with the present invention, the film is firstly cut into a predetermined shape, then placed on a welding die of a shape corresponding to that of the film, thereafter, a substrate is placed on the film and an upper electrode is lowered and pressed against the film and stbstrate, whereupon there is eliminated the necessity of providing a cutting blade around the welding die, and further in the present invention, there is provided a film guide mechanism around the welding die such that it is movable downwardly by the upper electrode, so as to facilitate the ease with which the film is placed on the welding die and the substrate is welded to the film.

Moreover, the present invention permits use of any colored film with a high-frequency weldability, such as a vinyl chloride, or a film having a pattern formed thereon.

DETAILED DESCRIPTION OF PREFERRED EMBODIMENTS OF THE INVENTION

Figure 1:
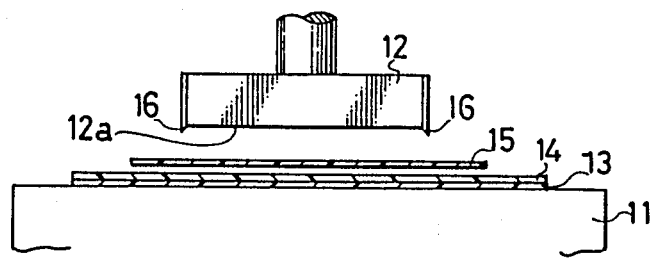
FIG. 1 is a sectional view showing a conventional method of forming a trim cover assembly.
Figure 2:
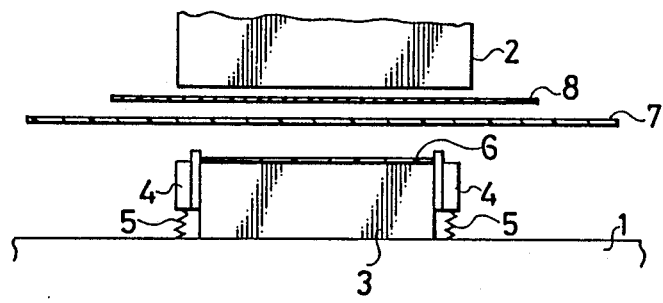
FIG. 2 is a sectional view showing a first embodiment of method in accordance with the present invention.
Figure 3:
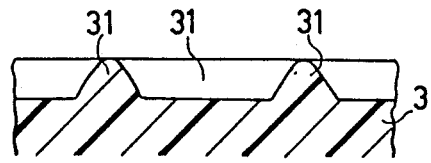
FIG. 3 is a partially enlarged sectional view showing a part of the surface of a welding die in accordance with the present invention.
Figure 4:
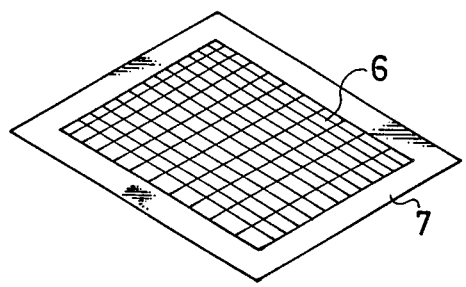
FIG. 4 is a perspective view of a resultant trim cover assembly produced in accordance with the first embodiment of the present invention.

Referring to FIGS. 2, 3 and 4, is illustrative of a first embodiment of the present invention.

In the present embodiment, designations (1) and (2) represent a lower electrode associated with a high-frequency welding machine, and an upper electrode associated also with the same welding machine, respectively. On the lower electrode (1) is mounted a welding die (3) made of silicone material which has film guides (4) provided therearound.

Designation (6) denotes a film adapted to represent a decorative pattern on a substrate (7), thereby providing a decorative effect on a trim cover assembly.

The welding die (3) is so formed as to have an outer contour identical to that of the film (6).

The film guides (4) are so arranged on the welding die (3) that they are vertically movable along the die (3) and normally biased by spring means (5) to partially project a small distance above the upper surface of the welding die (3), whereby the film guides (4) serve as a guide for the film to be placed upon the welding die (3) easily and correctly. With such structure, when pressed downwardly by the upper electrode (2), the film guides (4) are caused to move downwardly against the upward biasing force of the spring means (5), until the upper edges of the film guides (4) are brought to a point flush with the upper surface of the welding die (3), which allows direct welding of the film (6) to the substrate (7) without obstruction of the film guides (4) per se.

Now, at a first stage, prior to being subjected to the present invention method, the film (6) has been made from a material having a high-frequency weldability such as a vinyl chloride and been cut into a predetermined shape, in advance.

Such film (6) is placed on the welding die (3) in position with the supportive guide help of the film guides (4).

Then, the substrate (7), whether it may be made of leather or thin film material, is laminated upon the film (6), and an insulation paper (8) is laminated on the substrate (7).

Thereafter, the upper electrode (2) is lowered and pressed against those lamination, so that the substrate (7) is pressed onto the film (6), and then when energizing the upper and lower electrodes, the film (6) is welded to the substrate (7) under the effect of high frequency.

Thus, a trim cover assembly with a decorative pattern thereon is obtained.

FIG. 3 shows the upper surface of the welding die (3) in which formed are a plurality of protrudent portions (31). When this welding die (3) is pressed against the film (6), an uneven pattern is created on the film (6) by such plurality of protrudent portions (31), thereby improving an aesthetic appearance of the resultant trim cover assembly.

In FIG. 4, illustrated is a resultant trim cover assembly produced in accordance with the present invention, in which the film (6) is welded to the substrate (7) and a certain pattern corresponding to the protrudent portions (31) is created on the film (6).

Figure 5:
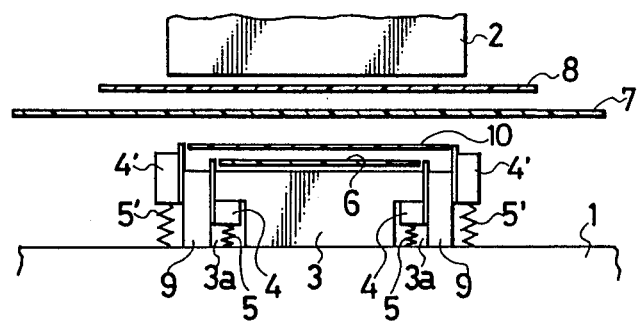
FIG. 5 is a sectional view showing a second embodiment of method in accordance with the present invention.
Figure 6:
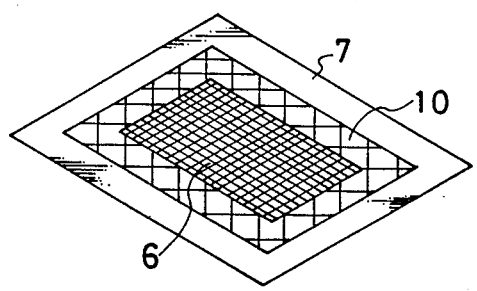
FIG. 6 is a perspective view of a resultant trim cover assembly produced in accordance with the second embodiment of the present invention.

Referring now to FIGS. 5 and 6, there is illustrated a second embodiment of the present invention. All the like reference numerals or characters refer to like parts described in the above-stated first embodiment.

In this second embodiment, a pair of first and second welding dies (3) and (9) are provided. The first die (3) is at its lower peripheral portions formed with a recessed space (3a) in which the film guides (4) and spring means (5) are housed. The second welding die (9) is disposed around the first welding die (3).

With regard to the second welding die (9), it is of a height indentical to that of the first welding die (3) so that the upper ends of the former welding die are positioned flush with those of the latter one. A one or different uneven pattern may be formed in the upper surface of each of the first and second welding dies (3)(9). Second film guides (4') are provided on the peripheral ends of the second welding die (9) so as to allow a second film (10) to be easily and correctly placed on the second welding die (9). The second film guides (4') are normally biased by spring means (5') to partially project above the upper surface of the second welding die (9) and similarly, the first film guides (4) are arranged just as in the first embodiment above. Accordingly, when pressed by the upper electrode (2), both upper ends of the first and second film guides (4)(4') are brought to a point flush with the respective upper surfaces of the first and second welding dies (3)(9), so that the substrate (7) is directly pressed onto and welded to those first and second films (6)(10) without the obstruction of the film guides (4)(4') per se.

In the present second embodiment, the first and second welding dies (3)(9) are formed such that the former die (3) has an outer contour identical to that of the first film (6) and the latter die (9) has an outer contour identical to that of the second film (10).

Similarly to the aforementioned first embodiment, at a first statge, the first film (6) and second film (10) have been cut into a predetermined shape. Then, the first film (6) is placed on the first welding die (3) with the guiding help of the first film guides (4), while on the other hand the second film (10) is placed on the second welding die (9) with the guiding help of the second film guides (4').

Then, a substrate (7) made of leather, thin film, or the like, is laminated on those first and second films (6)(10), and an insulation paper (8) is laminated on the substrate (7).

Thereafter, the upper electrode (2) is lowered and pressed against thus-laminated elements (6, 7, 8, 10) so that the first and second films (6)(10) are welded under high frequency to the substrate (7).

As shown in FIG. 6, a resultant trim cover assembly is produced in which two different decorative patterns are created on its surface by reason of the first and second films (6)(10) being welded to the substrate (7).

As having been discussed hereinbefore, the present invention is endowed with the following advantageous effects:

(1) No cutting blade or other cutting means is needed to provide a certain shape of film since the film is cut into a predetermined shape in advance. Consequently, there is eliminated the possibility of the substrate being cut unexpectedly, and the welding die per se does not require a strict design for precisely cutting of the film, thus contributing to the simplified and low-cost process.

(2) The welding die employed in the present invention can find many variations due to its structure allowing creation of a variety of different decorative patterns on the films and also different color combinations of films on the substrate, whereupon it is possible to easily and effectively produce an exceptionally beautiful appearance of trim cover aseembly with a high aesthetic design value.

What is claimed is:

1. A method of forming a trim cover assembly for an automotive seat, in which a high-frequency welding machine is employed comprising an upper electrode mounted in a vertically movable manner, a lower electrode, a welding die mounted on said lower electrode, said welding die having a predetermined outer configuration and an uneven surface formed therein, and a film guide provided on a peripheral wall of said welding die, said film guide being biased by spring means to partially project above an upper surface of said welding die, whereby said upper frame is lowered to press an upper end of said film guide, the upper end of said film guide is brought to a point flush with said upper surface of said welding die, wherein said method comprises the steps of:
   placing a film on said welding die, said film being adapted to represent a decorative pattern and having been cut into a shape identical to said outer configuration of said welding die;
   then, placing a substrate and an insulation paper on said film in order; and
   lowering said upper electrode in a direction towards said welding die and welding said film to said substrate by means of a high frequency current.

2. The method of forming a trim cover assembly according to claim 1, wherein said high-frequency welding machine further comprises a second welding die provided around said film guide provided on said peripheral wall of said welding die, and a second film guide provided on a peripheral wall of said second welding die, wherein said second film guide is so arranged that it is biased by spring means to partially project above an upper surface of said second welding die, whereby when said upper frame is lowered to press both upper ends of said first and second film guides, those upper ends of said first and second film guides are brought to a point flush with the respective said upper surfaces of said first and second welding die, and wherein said method further comprises the steps of:

placing said first film on said first welding die;
  placing said second film on said first film such that said second film, which has been cut into a shape identical to an outer configuration of said second welding die, is spread over said first welding die and placed on said second welding die;
  then, placing a substrate on said second film and an insulation paper on said substrate in order; and,
  thereafter, lowering said upper electrode in a direction towards said first and second welding dies and welding said first and second films to said substrate in an integral manner by means of a high frequency current.

3. The method of forming a trim cover assembly according to claim 2, wherein there an uneven portion is formed in an upper surface of said second welding die.

4. The method of forming a trim cover assembly according to claim 2, wherein said first film is of a different color than that of said second film.

5. The method of forming a trim cover assembly according to claim 1, wherein said substrate includes an artificial leather formed by applying a vinyl chloride film to a surface of a woven fabric.

6. The method of forming a trim cover assembly according to claim 1, wherein said film is of a different color than that of said substrate.

* * * * *